Oct. 31, 1967  R. P. GUSTAFSON ETAL  3,349,808
LOCKING DEVICE
Filed April 5, 1966

INVENTORS
RALPH P. GUSTAFSON
EDWIN C. SMILEY

United States Patent Office 3,349,808
Patented Oct. 31, 1967

3,349,808
LOCKING DEVICE
Ralph P. Gustafson, Hubbardston, and Edwin C. Smiley, Worcester, Mass., assignors to Crompton & Knowles Corporation, Worcester, Mass., a corporation of Massachusetts
Filed Apr. 5, 1966, Ser. No. 540,232
11 Claims. (Cl. 139—66)

This invention relates to an improved arrangement for releasably securing in place on a rotatable shaft a power transmitting member such as a cam or gear or sprocket and has particular utility in the securing of cams and gears on the driving shaft of a dobby used in a fabric loom. In one well-known kind of a loom a dobby is used to move the harness frames in accordance with a predetermined pattern. The locking arrangement of the present invention will be described in the environment of such a dobby, having what are called two-piece cams, actually two closely spaced cams on a driving shaft.

Experience has shown that in cam-driven dobbies, particularly those with two-piece cams, the usual splined connections between the cams and the cam drive shaft and also between the bevel gear and the shaft will work loose and that the splines on the drive shaft and within the power transmitting members (cams and gear) will wear. The continued loosening and wearing can reach a point where the splines will be stripped and the elements on the shaft will no longer be fixed in position either axially along the shaft or circumferentially around the shaft.

Various solutions have been tried but these have proved to be impractical, expensive or unsatisfactory.

The problems of loosening and wear are believed to derive from the fact that in many dobbies there will be an unbalanced load condition or shifting of loads in opposite directions about the driving shaft, causing rocking of the cams back and forth on the splined driving shaft. It therefore is felt that the splined sliding fit between the shaft and two adjacent members on the shaft can be taken advantage of by an arrangement according to this invention in which the two adjacent members on the shaft can be taken advantage of by an arrangement according to this invention in which the two adjacent members on the shaft can be forced in opposite directions about the shaft this forcing of the members in opposite directions being used to take up virtually all of the play between the members and the shaft in both directions circumferentially so that the shifting loads on the power transmitting members, whether cams or gears, will not have an opportunity to work the members loose on the shaft or to wear the splines. In this manner the present invention overcomes the problems of maintaining a proper connection between a driving shaft and a power transmitting member thereon, while providing a release from the connection when replacement or adjustment of the power transmitting members is desired.

In the drawings, which show the invention in exemplary fashion:

Figure 1:
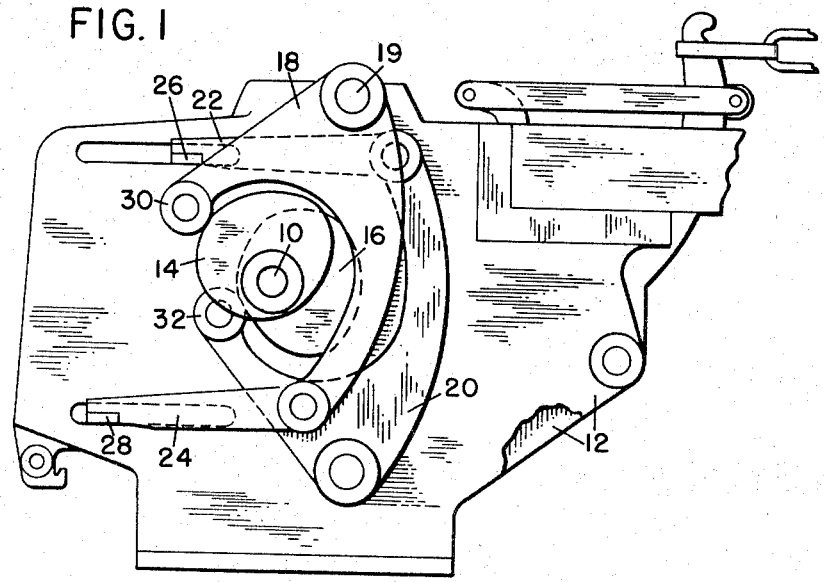
FIG. 1 is a side elevation of parts of a dobby showing the layout of a draw knife cam drive to which the present invention is applied.
Figure 2:
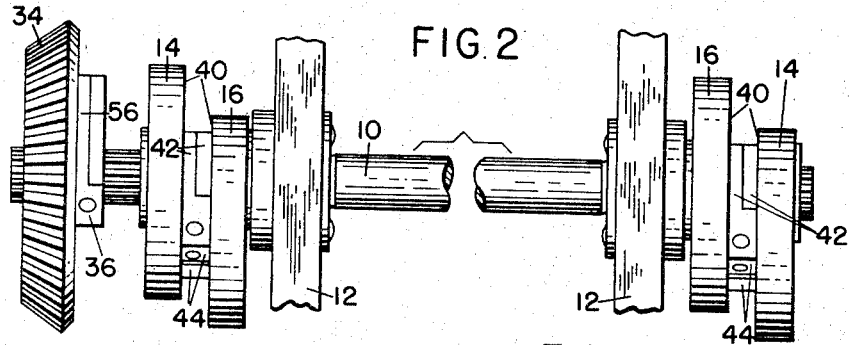
FIG. 2 is a top plan view on a larger scale of parts of the cam drive of FIG. 1 showing the mounting of the cams and other members on the drive shaft.

The locking arrangement of the present invention is shown in a dobby having a cam drive shaft 10 rotatably mounted in suitable bearings in a pair of frames 12, and this shaft carries on each side of the dobby a double cam, comprising a cam 14 and a cam 16. A pair of bell crank levers 18 and 20, one on each side of the dobby, are connected to reciprocative driving links 22 and 24 which carry the upper knife 26 and the lower knife 28, respectively, the knives extending as usual across the dobby frame. The bell cranks 18 are mounted each on a pivot 19 on each dobby frame and each carries at one end a cam follower or roller 30 which engages with a cam track of one of the cams 14 and thus transmits to-and-fro movement to the lower knife 28. A similar arrangement is provided for the upper knife 26, with the movement of this knife controlled by the cam tracks on cams 16, rollers 32 on bell cranks 20, and driving links 24.

The cam shaft 10 carries at one end a bevel gear 34 which is suitably driven by a meshing bevel gear (not shown) receiving rotative power in a fashion usual and well understood in machines of this character.

Suitable biasing means (not shown) resiliently force the cam followers or rollers 30, 32 of each pair of knife moving bell cranks into active engagement at all times with the driving surfaces on cams 14 and 16, respectively, so that the rotative position of the shaft 10 controls the positions of the knives 28 and 26 in a manner well known. In operation of the dobby, the splined shaft drives the pairs of cams 14 and 16 which operate the lower and upper knives, respectively. When the knives are moved to the left as seen in FIG. 1, they act to lift the harness frames (not shown) and when moved to the right, allow the harness frames to be lowered with the help of hold-down springs located underneath the harness frames. The upper and lower knives operate alternately, lowering and lifting different combinations of harnesses depending upon the particular weaving pattern. Cam 14 is one pick out of phase with respect to cam 16. When cam 16 is acting to raise harness frames, cam 14 is lowering; and when cam 16 is lowering, cam 14 is raising.

Difficulties arise when fancy weave patterns are involved or harness distribution is unequal, these conditions tending to shift the loads imposed on the cams and causing them to rock back and forth on the splines on the driving shaft. Variations in load also are imposed on the driving gear. The present invention is designed to stop the rocking of the cams on the splined shaft and to provide an arrangement whereby these or other power transmitting members can be releasably locked to the driving shaft.

In a manner usual in dobbies of the type here involved, the ends of the driving shaft 10, at least to the extent where the cams and gears are to be mounted, are provided with a number of equally spaced axially extending grooves to produce what is known as a splined shaft. The cams 14 and 16, and the gear 34 are all provided with cylindrical apertures that are internally grooved to provide matching internally splined surfaces axially slidably fitted on the splined shaft. Cams and gears as thus far described are known and used in dobbies before this invention.

The locking arrangement of this invention will be described in connection with a pair of the cams 14, 16. As will be clear from the description that follows, this same releasable locking arrangement can be provided for the gear 34 on the end of the shaft. When dealing with pairs of cams such as 14 and 16, one or the other or both of them may be regarded as a power transmitting member and the other cam considered as a locking member. Essentially the same elements may be used in releasably locking the gear 34 to the shaft. In this case the gear 34 is the power transmitting member and a separate internally splined collar 36 is provided as the locking member.

Each of the cams is provided with a face 40 extending normal to the axis of the hole in the cam and therefore in a plane normal to the axis of the drive shaft when the cam is mounted thereon. Oppositely facing hubs 42 on each of the cams may be used to space the faces 40 of the cam bodies away from each other when they are mounted on the shaft.

Figure 3:
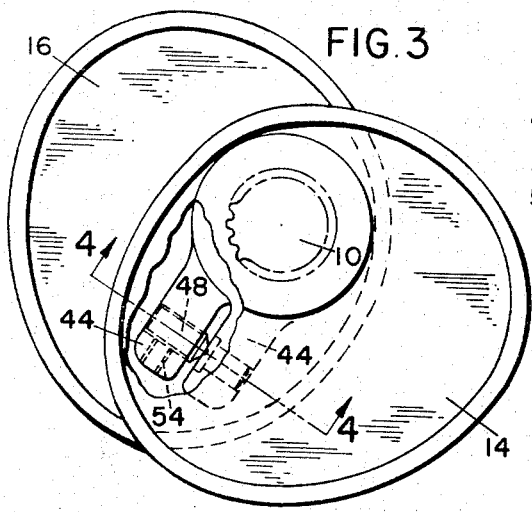
FIG. 3 is a side view on a still larger scale, with portions broken away, showing the cams and locking members secured to the drive shaft in accordance with a preferred form of this invention.
Figure 4:
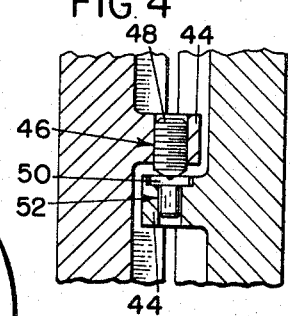
FIG. 4 is a sectional view on the lines and in the direction of the arrows 4—4 of FIG. 3, showing the cooperating locking members and formations on the cams.

On the opposed adjacent faces of each of the cams there is provided an integral projecting portion 44 in the shape of an arm that extends radially away from the splined hole in the cam, and this arm projects axially in a direction toward the adjacent face of the opposite cam. As seen most clearly in FIGS. 3 and 4, these radially extending projecting arms are oppositely radially juxtaposed, and lie in the space between the adjacent faces of the cams. In one of these projecting arms a tapped hole 46 is provided in which a set screw 48 is threadedly engaged, the inner end of this screw constituting a bearing portion that extends into rotative engagement with a bearing stud 50 of hard metal seated in an appropriate aperture 52 in the other projecting arm 44 opposite the end of said screw. As should be obvious from an inspection of FIGS. 3 and 4, when the screw 48 is advanced or tightened, its bearing end will press against the stud 50 and force the projecting arms 44 apart, thus moving the cams in opposite directions about the driving shaft and forcing the splines in the cams in opposite directions into close frictional engagement with the splines on the shaft. This effectively locks the cams in place on the shaft against both axial movement along the shaft and circumferential movement around the shaft. Although it is customary to check and tighten this locking arrangement once a day during the first few days of operation, and less frequently thereafter until the locking device seats itself properly and no further loosening is detected, it is well to add a locking screw 54 threaded into a tapped hole at right angles to the set screw 48, this locking screw being provided with a brass plug at its end to prevent damage to the threads of the set screw. The locking screw, when tightened, prevents loosening of the set screw.

In the preferred form, either projection 44 may be provided with the tapped hole 46 and set screw 48, the other projection on the opposite member or cam being provided with the bearing stud 50. Obviously, the end of the set screw is provided with an "Allen" recess, slot, or similar formation for turning the screw by means of a screw driving tool inserted between the faces of the opposed cams. The end of the set screw 48 is accessible in a plane normal to the axis of the shaft. The end of the locking screw 54 also lies in that plane.

Figure 5:
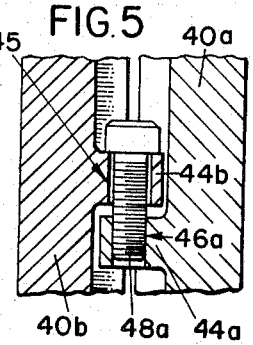
FIG. 5 is a sectional view like FIG. 4 but showing a modified form of locking arrangement according to the invention.

FIG. 5 shows a modification of the invention that has some disadvantages but that may be used in situations where operating conditions are not too severe and where manufacturing economies may be desired. In this form one of the cams (or a power transmitting member) 40a is provided with a projection 44a carrying a tapped hole 46a into which a shouldered set screw 48a is threaded. The other cam (considered as the locking member), 40b has a projection 44b with a clearance hole 45 therein through which the headed end of the set screw 48a extends. The shouldered head on the set screw may be considered the equivalent of the bearing portion on the end of the set screw in the other form and the shoulder on the head will rotatively engage against a bearing surface on the projection 44b around the clearance hole, this surface being hardened if desired.

In this form of the invention the two cams or other members are initially mounted on the splined shaft in such a manner that there is some space between the radially juxtaposed faces of the projecting portions 44a and 44b. When the set screw 48a of this form is inserted and tightened, it will tend to draw the radially juxtaposed portions toward each other and move the cams in opposite directions about the driving shaft, locking these members by close frictional engagement of the splines. If desired, a locking screw 54 may also be provided for the set screw 48a as in the other form.

As above stated, this same releasable locking arrangement may be used to secure the gear 34 or a similar power transmitting member to the splined shaft. In this case, the hub 56 on the gear is comparable to the hub 42 on one of the cams and the main body of the locking collar 36 may take the same form and shape as the hub. Both the gear 34 (power transmitting member) and the locking collar 36 (locking member) are internally splined and provided with the integral radially and axially extending projecting portions identical with the projecting arms 44 on the cams, these projections being provided with a set screw and cooperating formations for locking the gear and collar in place on the splined shaft, all as described above in connection with the double cam locking arrangements.

As will be evident from the foregoing description, certain aspects of this invention are not limited to the particular details set forth as examples, and it is contemplated that various and other modifications and applications of the invention will occur to those skilled in the art. It is therefore intended that the appended claims shall cover such modifications and applications as do not depart from the true spirit and scope of the invention.

What is claimed as new and is desired to be secured by Letters Patent of the United States is:

1. Means for releasably locking a power transmitting member to a shaft, said shaft having external splines thereon and said member having an aperture therethrough provided with internal splines axially fitted on said splined shaft, said means comprising:
   (a) a projecting portion on at least one side of power transmitting member,
   (b) a unitary locking member having an aperture therethrough provided with internal splines axially slidably fitted on said splined shaft, said locking member having a projecting portion on at least one side thereof,
   (c) adjustable means acting on said projecting portions for forcing said power transmitting member and said locking member in opposite circumferential directions about the shaft, whereby the internal splines in said members are releasably locked in opposite directions into close frictional engagement with the splines on said shaft.

2. The locking means set forth in claim 1 wherein said adjustable means is a screw means threadedly engaged in at least one of said projecting portions, whereby upon rotation of said screw means in advancing direction said projecting portions and said members are forced in said opposite directions.

3. The locking means as set forth in claim 2 wherein said screw means is threaded into one of said projecting portions and bears against the other of said projecting portions when said screw is advanced.

4. The locking means as set forth in claim 3 wherein said projecting portions of said power transmitting member and of said locking member lie adjacent to each other and are oppositely radially spaced and juxtaposed at a distance from said splined apertures in said member, said screw means having a threaded portion and a relatively enlarged head portion; one of said projections having an aperture through which said threaded portion extends, said other projection having a threaded aperture aligned with the aperture in said first projection and into which said threaded portion of said screw means is threaded so that upon advancement of said screw means said spaced projections are urged toward each other.

5. The locking means set forth in claim 3 whereby said projecting portions of said power transmitting member and of said locking member lie adjacent each other and are oppositely radially juxtaposed at a distance from said splined aperture in said members, one of said projecting portion having a threaded aperture through which said screw means can be threaded so that the screw means can be advanced through said aperture in the direction of said other projecting portion until the leading edge of the screw means strikes said other projecting portion and upon further advancement, the screw will force said two projecting portions radially apart.

6. In a loom dobby operating to reciprocate a pair of harness lifter knives, a power transmitting shaft having external splines thereon, a power transmitting member for operating each of said knives, and means for releasably locking said power transmitting member to said shaft, said means comprising:
   (a) a projecting portion on at least one side of said power transmitting member,
   (b) a unitary locking member having an aperture therethrough provided with internal splines axially slidably fitted on said splined shaft, said locking member having a projecting portion on at least one side thereof,
   (c) adjustable means acting on said projecting portions for forcing said power transmitting member and said locking member in opposite circumferential directions about the shaft, whereby the internal splines in said members are releasably locked in opposite directions into close frictional engagement with the splines on said shaft.

7. The locking means set forth in claim 6 wherein said adjustable means is a screw means threadedly engaged in at least one of said projecting portions, whereby upon rotation of said screw means in advancing direction said projecting portions and said members are forced in said opposite directions.

8. The locking means as set forth in claim 7 wherein said screw means is threaded into one of said projecting portions and bears against the other of said projecting portions when said screw is advanced.

9. The locking means as set forth in claim 8 wherein said projecting portions of said power transmitting member and of said locking member lie adjacent to each other and are oppositely radially spaced and juxtaposed at a distance from said splined apertures in said member, said screw means having a threaded portion and a relatively enlarged head portion; one of said projections having an aperture through which said threaded portion extends, said other projection having a threaded aperture aligned with the aperture in said first projection and into which said threaded portion of said screw means is threaded so that upon advancement of said screw means said spaced projections are urged toward each other.

10. The locking means as set forth in claim 8 whereby said projecting portions of said power transmitting member and of said locking member lie adjacent each other and are oppositely radially juxtaposed at a distance from said splined aperture in said members, one of said projecting portions having a threaded aperture through which said screw means can be threaded so that the screw means can be advanced through said aperture in the direction of said other projecting portion until the leading edge of the screw means strikes said other projecting portion and upon further advancement, the screw will force said two projecting portions radially apart.

11. In a loom dobby operating to reciprocate a pair of harness lifter knives, a power transmitting shaft having external splines thereon, at least one pair of actuating cams having an aperture therethrough provided with internal splines and axially fitted on said splined shaft, wherein one of said cams is operating one of said lifter knives for a harness lifting stroke followed by a harness lowering stroke while the other of said cams is operating the other of said knives for a harness lowering stroke followed by a harness lifting stroke, and means for releasably locking said cams to said shaft, said means comprising:
   (a) a projecting portion on one of said cams,
   (b) a projecting portion on the other of said cams,
   (c) adjustable locking means acting on said projecting portions for forcing said cams in opposite circumferential directions about the shaft, whereby said members are forced in opposite directions about said driving shaft, and the internal splines in said cams releasably locked in opposite directions into close frictional engagement with the splines on said shaft.

References Cited

UNITED STATES PATENTS

| | | | |
|---|---|---|---|
| 403,901 | 5/1889 | Bailey | 287—52.03 |
| 2,287,343 | 6/1942 | Dudo | 287—52.03 |
| 3,225,792 | 12/1965 | Pizzoela et al. | 139—71 |
| 3,260,542 | 7/1966 | Di Milla | 287—535 |

HENRY S. JAUDON, *Primary Examiner.*